(12) United States Patent
Lob et al.

(10) Patent No.: US 7,494,110 B2
(45) Date of Patent: Feb. 24, 2009

(54) ARRANGEMENT FOR LIFTING AND LOWERING OBJECTS

(75) Inventors: Charles Lob, Oconomowoc, WI (US); Paul G. Vanden Heuvel, Hubertus, WI (US)

(73) Assignee: Harken, Inc., Pewaukee, WI (US)

( * ) Notice: Subject to any disclaimer, the term of this patent is extended or adjusted under 35 U.S.C. 154(b) by 139 days.

(21) Appl. No.: 11/491,108

(22) Filed: Jul. 21, 2006

(65) Prior Publication Data

US 2007/0023741 A1 Feb. 1, 2007

Related U.S. Application Data

(63) Continuation of application No. 10/920,649, filed on Aug. 18, 2004, now abandoned.

(51) Int. Cl.
*B66D 1/02* (2006.01)
*B62H 3/00* (2006.01)

(52) U.S. Cl. .................. 254/334; 254/338; 211/117; 248/317

(58) Field of Classification Search .............. 254/334, 254/338, 393, 278, 283, 286, 385, 375, 376; 211/17, 162, 182, 209; 248/317, 320, 321, 248/322, 324, 328; 160/170, 168.1 R, 178.2
See application file for complete search history.

(56) References Cited

U.S. PATENT DOCUMENTS

| | | | |
|---|---|---|---|
| 557,567 A | 4/1896 | Eddy | |
| 569,289 A | 10/1896 | Lynch | |
| 3,828,936 A | 8/1974 | Hoenig | |
| 3,872,972 A | 3/1975 | Cummins et al. | |
| 3,924,751 A | 12/1975 | Ballenger | |
| 4,116,341 A | 9/1978 | Hebda | |
| 5,125,517 A | 6/1992 | Martinell | |
| 5,292,009 A | 3/1994 | Smith | |
| 5,553,715 A | 9/1996 | Brotz | |
| 5,702,007 A | 12/1997 | Fritz et al. | |
| 5,887,461 A | 3/1999 | Heffley | |
| 5,897,104 A * | 4/1999 | Garbiso | 254/334 |
| 6,045,021 A | 4/2000 | Stites | |
| 6,161,702 A * | 12/2000 | Campbell | 211/17 |
| 6,484,888 B2 | 11/2002 | Miller | |
| 6,786,270 B2 * | 9/2004 | Wen et al. | 160/170 |
| 2004/0103995 A1 * | 6/2004 | Nien | 160/170 |

* cited by examiner

*Primary Examiner*—Evan H Langdon
(74) *Attorney, Agent, or Firm*—Alan R. Stewart; Godfrey & Kahn, S.C.

(57) ABSTRACT

An arrangement for raising and lowering relative light weight objects from a ground position to a high storage position. A bracket is secured to the high storage position and supports a vertical rotatable shaft, with a pair of horizontal reels and an automatic lock position. A rod is detachably attached to the shaft and extends horizontally downwardly to the ground position. Rotation of the shaft around its central axis causes rotation of the reels. The reels are affixed to two lines which extend generally horizontally from the reels, with the free ends of the lines extending over spaced pulleys and extending downwardly for attachment to the ground level. Rotation of the shaft allows raising and lowering of the object. A spring loaded mechanism associated with the shaft causes automatic locking of the reels in any position, and locks the reels upon raising to the high storage position. The spring loaded locking mechanism is responsive to a slight downward pull on the shaft to an unlocking position, and release of the shaft causes the reels to automatically lock.

18 Claims, 4 Drawing Sheets

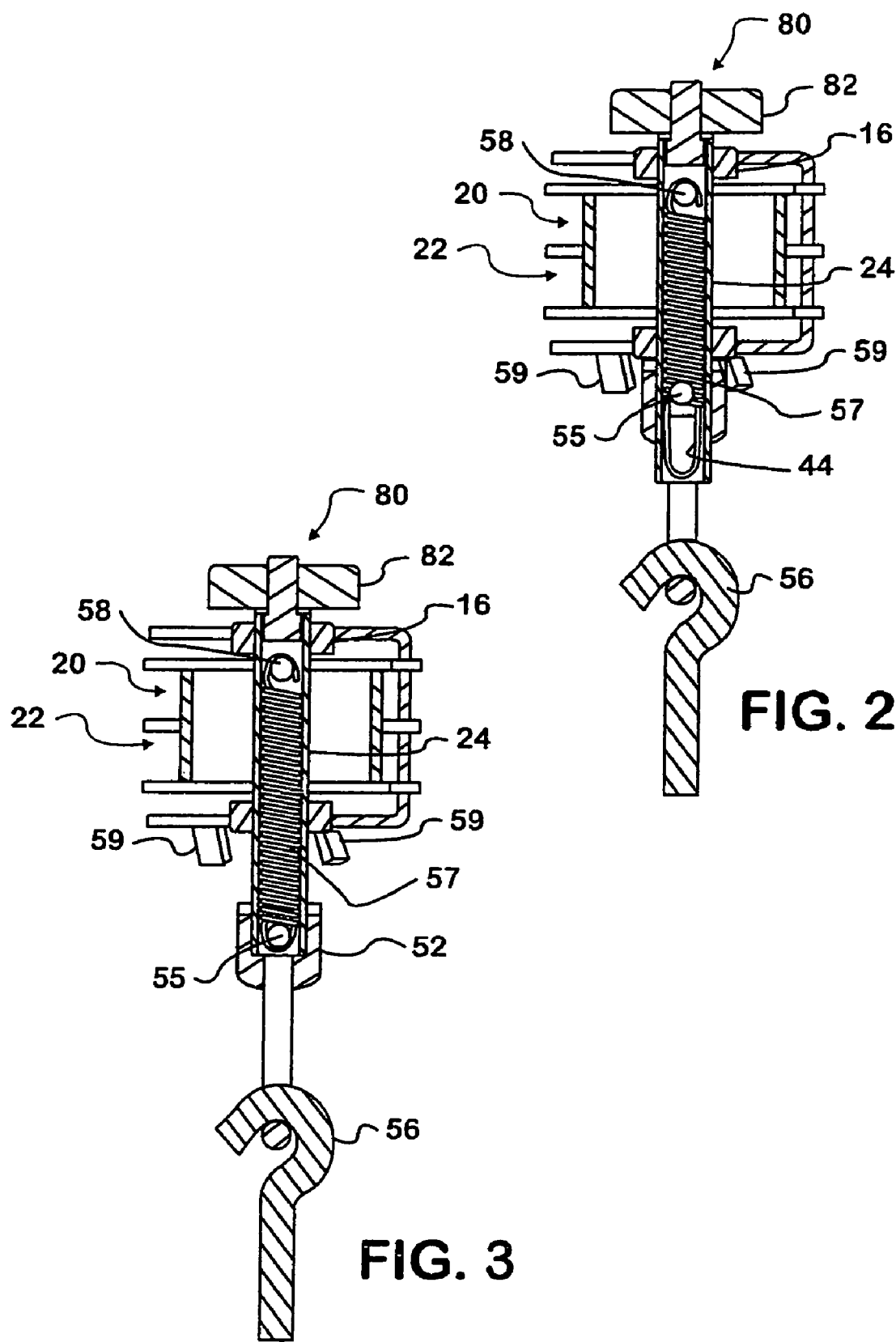

ARRANGEMENT FOR LIFTING AND LOWERING OBJECTS

This nonprovisional application is a continuation of U.S. nonprovisional application Ser. No. 10/920,649 of the same title and the same applicants, filed on Aug. 18, 2004 now abandoned and claims the benefit of said prior application, and the invention relates to a compact device for raising and lowering objects, releasably locking the object in the raised or other safe position, and lowering the object, all in a safe and reliable manner.

BACKGROUND OF THE INVENTION

There are many situations wherein an object such as a bicycle, small water craft, support platform, and the like, needs to be stored in a building in an elevated position, e.g., near the ceiling of a room, which is normally empty, and such elevated storage allows room beneath for the accommodation of additional items, such as in a garage or in a retail outlet. As one example, bicycles in large retail outlets are stored in horizontal layers to allow for storage of a large number of bicycles to be stored in a compact space. The uppermost layer is typically attached to fixed hooks which depend from or near the ceiling, or in a raised position which may be ten feet high or greater. Various types of lifting, lowering and securement devices have been described in the prior art, including U.S. Pat. Nos. 557,567; 569,289; 3,828,936; 3,872,972; 3,924,751; 4,116,341; 5,125,517; 5,292,009; 5,553,715; 5,702,007; 5,887,461; 6,045,021; 6,484,888; and others.

There is a significant need to provide a device that can raise and lower bicycles, small water craft, storage platforms, and the like, in which the object can be raised and locked in an upright position, and then lowered to the ground in a safe and reliable manner.

SUMMARY OF THE INVENTION

The present invention comprises a mechanism which includes a bracket affixed or mounted to or on a wall or other support near the intended raised position. The bracket holds a rotatable hollow vertical shaft having at least two adjacent horizontal reels or drums secured to the shaft and separated by flanges such that the reels operate together with the shaft, with each reel being wrapped by a line having a free end which extends general horizontally from the reels and through spaced pulleys or blocks with the free ends loading downwardly and with the free ends having a means for attachment to the object to be lifted and lowered. The lower end of the shaft carrying the reels is preferably connected to a rigid loop.

The loop is releasably connected to an open hook or so-called Shepard's hook, the lower end of which is secured to a vertical or hanging torsionally resistant elongated member such as a rod, which extends toward and near ground level. A crank or equivalent rotation assisting device is connected near or to the lower end of the rod to allow rotation of the rod around its longitudinal or central axis in either direction. Rotation of the rod in one direction, with the object lowered, causes rotation of the upper shaft and reels, which serve to turn the reels and draw in or wrap up the lines extending therefrom. In this manner, an object connected to the free ends of the drum lines can be raised or lowered without difficulty.

A stop and locking device is associated with the reels, shaft and bracket. This mechanism preferably comprises at least a pair of downwardly and inwardly inclined tags or ramps secured to the bracket. A horizontal rod extends through the shaft and preferably has a roller at each end. There is a vertical slot in the lower end of the shaft which receives the horizontal shaft to allow the locking and unlocking device to operate, wherein the rollers move up on the inclined ramps of the bracket to lock the drums, or downward to unlock the device. A helical or coil extension spring is disposed within the hollow vertical shaft and extends from a fixed pin secured in the upper part of the shaft, with the other end being attached to the locking assembly and the open or J hook. The spring is arranged or partially extended under tension and, in order to raise the hook and lock the device, in the event that the vertical rod is released during raising or descent. A slight downward force on the rod is required to unlock the rollers and lower or raise the object. Also, preferably, there is a one-way damping device mounted on the bracket and attached to an upper portion or stub of the shaft, which is free wheeling as the object is being raised but damps and slows lowering of the object.

Once the object has been raised, the upper end of the torsionally loaded vertical shaft can be released from the loop of the upper mechanism to allow use at a different location and/or prevent tampering without unlocking the device. Thus, while very little skill is needed to operate the arrangement, the combination provides a very safe and reliable operation.

Other advantages and possible modifications will become apparent from the attached description.

BRIEF DESCRIPTION OF THE DRAWINGS

FIG. 2 is a cross sectional view through line A-A of FIG. 1, showing the device of the present invention in a locked position to lock the object in a vertical raised position.

FIG. 3 is a cross sectional view through section line A-A of FIG. 1, showing the device in an unlocked position, whereby the object can be raised or lowered.

DETAILED DESCRIPTION OF THE DRAWINGS

Figure 1:
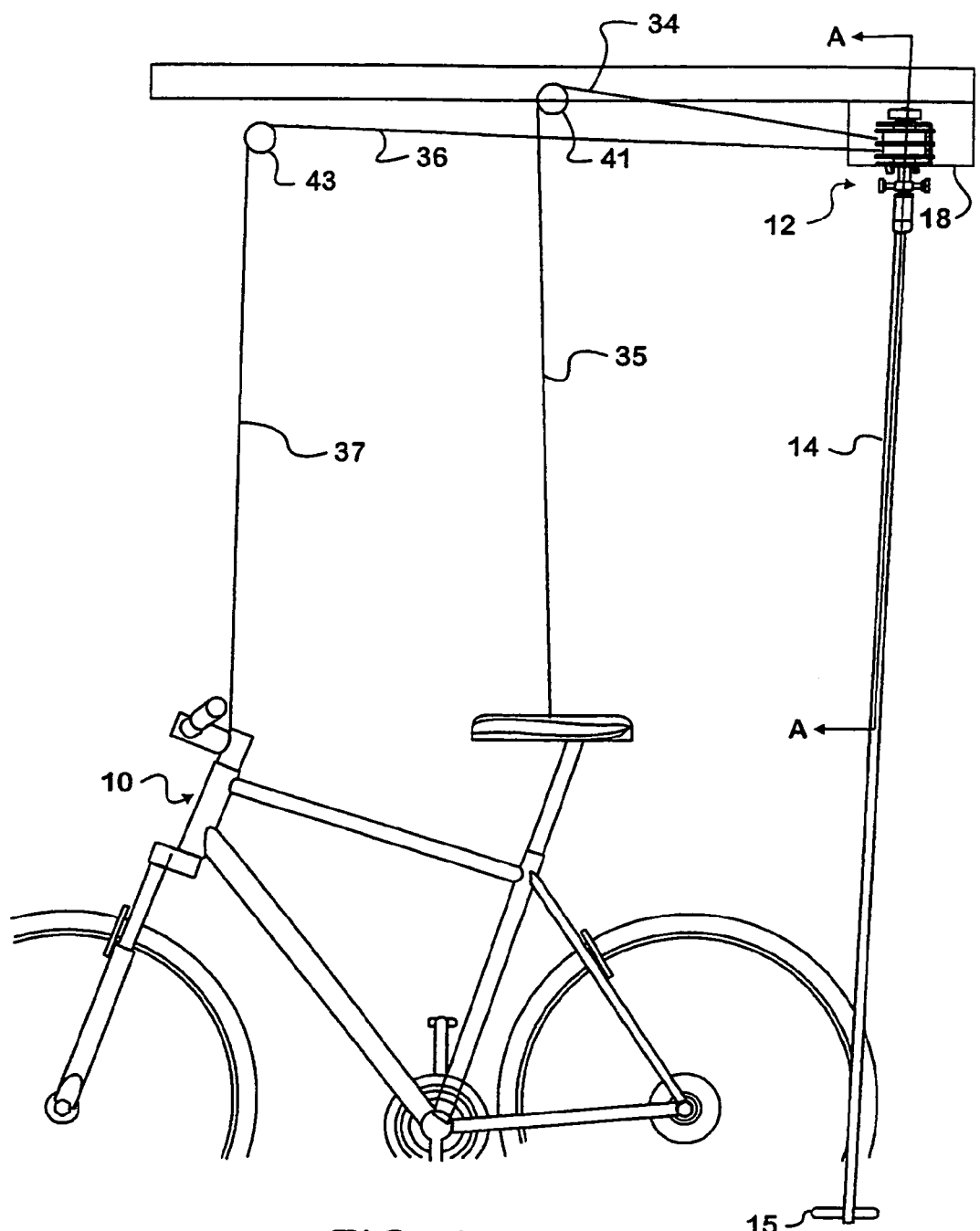
FIG. 1 is a side view of the apparatus, shown in the process of raising or lowering an object, in this case, a bicycle.

FIG. 1 is an overall side view of the present invention showing the raising or lowering of a bicycle 10. Obviously, the device of the present invention is capable of raising and lowering any device such as a bicycle, a water craft, small storage platform, and any regular or irregular shaped object. The device is capable of raising an object from two or more spaced horizontal locations from the device, which will become apparent from the following description. In general, the lower part of the arrangement will reach to the floor level within the convenient reach of an operator and an elevated level beyond the reach of the operator. The main operating device 12 is shown in an elevated position near a ceiling or position beyond the convenient reach of a user standing on the ground.

The device shown in FIG. 1 includes a substantially torsionally resistant member 14 such as a rod. The rod 14 may take many forms such as a metal rod, a reinforced rod containing a polymer and fibers or yarns, and the like. Also, other examples include rods which are torsionally resistant around their axis, but are bendable along their length. The rod or bar may be capable of being twisted to a limited degree to accommodate any excessive forces applied thereto. The bar need not be circular in cross section, and the term "bar" is used only to describe a means for accomplishing the intended function.

The rod 14 may also comprise a means to facilitate the rotation of the rod at or near the lower end thereof. FIG. 1 shows a T-shaped crank 15, but very obviously, other equivalent devices, if needed, may be employed, such as an increased diameter grip, single handle crank, and the like.

As shown in FIGS. 1-5, the operating device 12 may be secured by a bracket 16 affixed to a vertical stationary support surface 18, such as a wall or support beam as shown in FIG. 1. The other parts of the device are movable relative to the bracket 16.

The main operating device comprises at least a pair of reels 20 and 22 secured, such as by welding, to a central rotatable vertical shaft 24. As shown in the preferred embodiment, the reels 20 and 22 may be separate but are preferably integral or one piece comprising outer flanges 28 and 30 and an inner flange 32 defining the two reels 20 and 22, and respective drums 26 and 27. The outer annular sides of the reels 20 and 22 are supported by circular bearing races (not shown), which act as thrust bearings and assume free and easy rotation of the reels in either direction under axial loads. The bearings in the races may be made of a polymer that does not require lubrication.

It will be understood that the diameter of the inner portions or drums 26 and 27 of the reels are preferably equal to allow lifting an object at spaced locations in a linear and horizontal position. Lines 34 and 36 are wrapped around each reel 20 and 22, with one end being secured to each reel, and the other ends 40 and 42 being free and extending over horizontally spaced pulleys or blocks 41 and 43, which changes the directions of the free ends of the lines 40 and 42 from a horizontal to a downwardly hanging vertical position as shown at 35 and 37.

Figure 4:
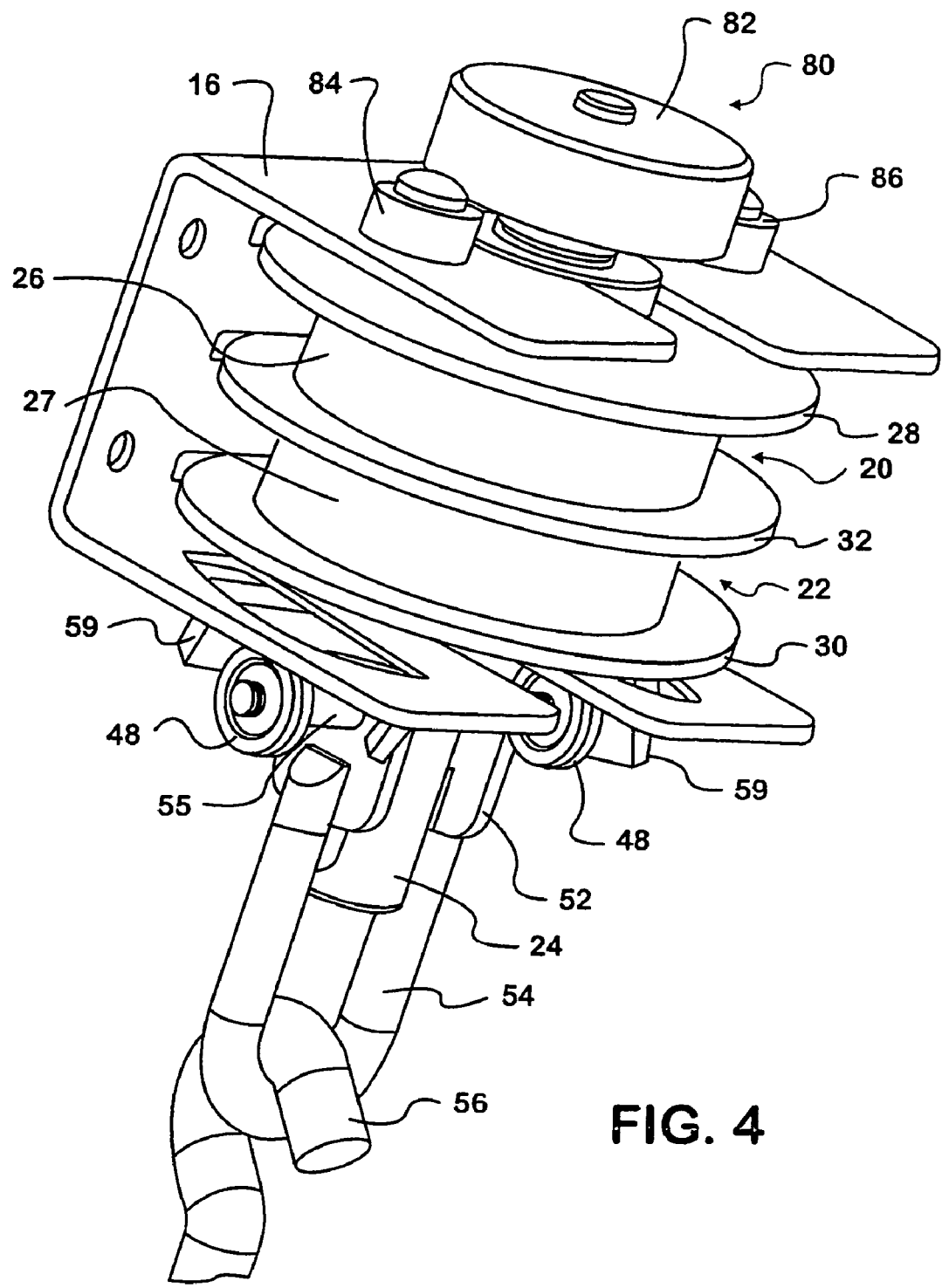
FIG. 4 is a perspective view of the operating portion of the primary device of the present invention in a locked position.
Figure 5:
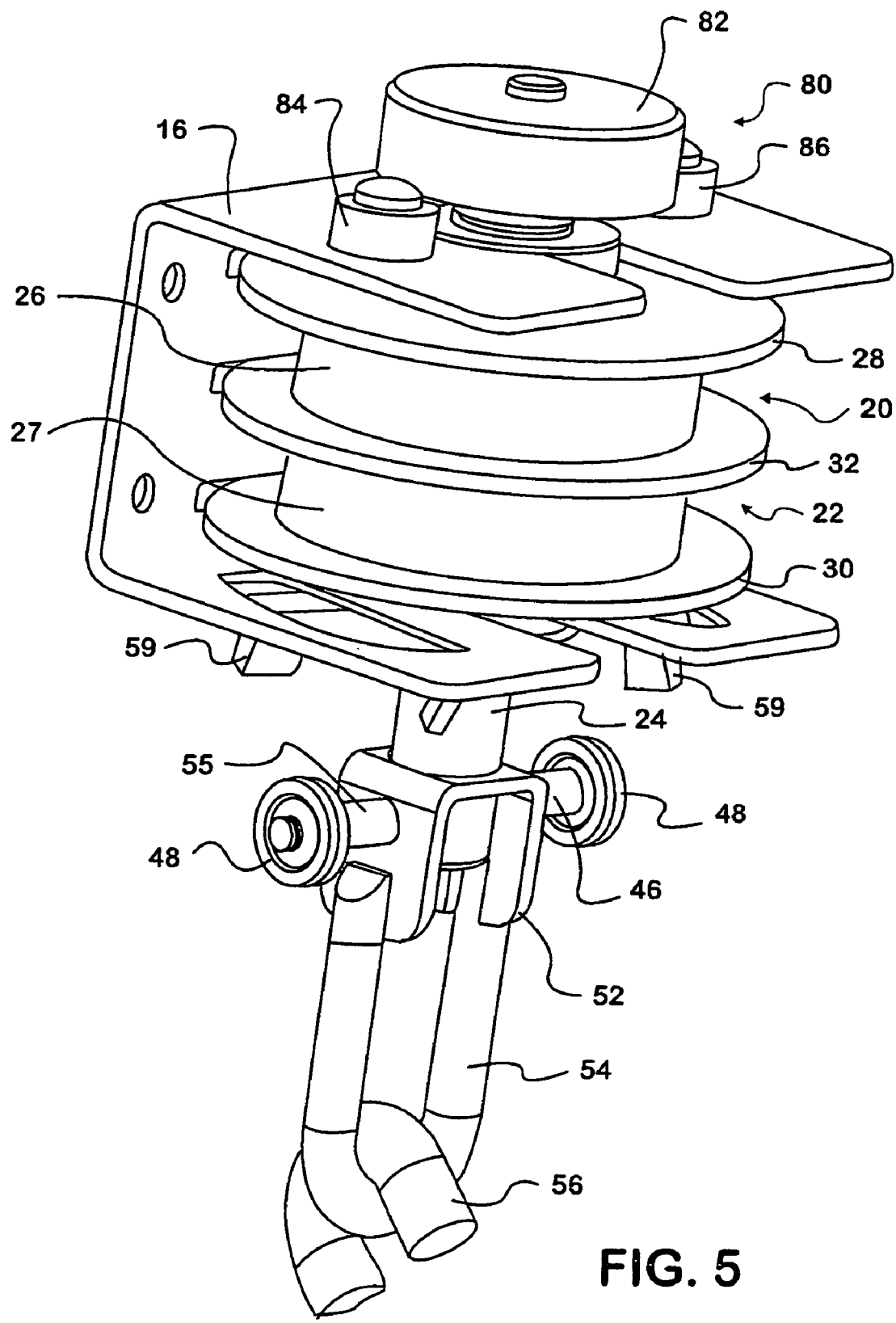
FIG. 5 is a perspective view of the device of the present invention shown in an unlocked position.

In the preferred embodiment as shown, the drums of the reels are equal in diameter; lines 34 and 36 (FIG. 1) are securely wrapped around the respective drums 26 and 27 of the reels 20 and 22. As shown in FIGS. 3 to 5 a single cylindrical piece forms the drums 26 and 27 of the reels. As shown therein ends of this single piece have outer flanges 28 and 30. The lines 34 and 36 as shown, are wrapped in a clockwise direction whereby the lines are pulled in equally in the same raising direction and are released equally in the other or release direction. As noted, the diameter of the two or more drums is equal to allow even raising of the object. Drums of the same diameter may be changed in diameter. For example, substitution of small diameter drums will provide more leverage during the raising operation and take up or accommodate more line, or alternatively, the diameter of the drums may be increased to take up or accommodate less line (with less leverage) and make the raising operation quicker. Conditions, such as the weight of the object to be lifted, and the final height of the elevation position will dictate an efficient drum diameter, as will be apparent to those skilled in the art.

The free ends 35 and 37 of the respective lines 34 and 36 are passed over rotatable pulleys 41 and 43 to change the direction of the lines 34 and 36 from generally a horizontal direction to generally vertical position of the free ends 35 and 37, which thereby hang down vertically toward the lower or floor level. Pulleys 41 and 43 are preferred, since they serve to reduce friction, but other means can be employed for this purpose, such as circular metal eyes. Also, the free ends 35 and 37 need not be single ends but may be bifurcated, for example to support a sling or to attach the ends at spaced locations on the object 10.

The free ends 35 and 37 are attached at their free ends to an object to be lifted by any suitable means. For example, simple hooks, bars, Velcro strips, clamps, and the like, may be releasably connected to the object 10. The horizontal spacing of the pulleys or blocks 41 and 43 can be adjusted to balance the object to be raised, the length of the free ends 35 and 37 may be unequal to allow a difference in vertical attachment locations.

While the preferred embodiment shows the wrapped lines extending horizontally from one side of the drums, they may extend in opposite directions and wound in opposite directions, provided that the lifting device is centrally positioned between the two spaced pulleys.

Referring back to the drawings, the central vertical shaft 24 is hollow like a tube and the lower end comprises through vertical slots 44 in alignment. A horizontal shaft 55 extends through the slots 44, the ends of which carry rotatable rollers 48 near the free ends 50 of the horizontal shaft. An inverted U-shaped bracket 52 is mounted inwardly from the rollers around the horizontal shaft 55 and is rotatable therewith. A U-shaped closed loop member 54 is secured to the bracket 52 and releasably receives the upper end of a J hook 56 and hence, the manually operated rod 14.

A helical tension or extension spring 57 is mounted in the hollow portion of the vertical main shaft 24 and has its upper end secured to the shaft by means of a horizontal pin 58 through the vertical shaft.

The U-shaped bracket 54 is embraced by the secondary horizontal shaft 55 and is rotatable therewith. The lower end of the spring 57 is attached to the horizontal shaft 55 and elongates under tension if the shaft moves vertically downwardly. Thus, the spring 57, inverted U-shaped bracket 52, and closed loop 54, rotate with the primary vertical shaft 24 and the rod. In other words, the tension on the spring 57 is not altered by rotation of the primary shaft 24. At the same time, the secondary horizontal shaft 55 is rotatable with vertical shaft and is movable vertically up and down in the lower elongated vertical slot 44 in the bottom of the secondary shaft.

The bracket additionally comprises a pair of opposed and downwardly inclined extending ramps or tabs 59, which are engageable with the rollers 48 to lock the mechanism. The spring 57 is installed in a partially extended or neutral state with the device 12 in a locked position.

In addition, the device 12 may comprise a damping mechanism 80, with a central roller 82 mounted on the upper end of the vertical shaft, and a pair of co-acting rollers 84 and 86 mounted on the top of the bracket 16. This damping mechanism of the device 12 is available commercially and allows free wheeling in the raising direction and controlled or damped rotation in the lowering position in order to add additional security during operation.

When the device 12 is in a locked position, the tension on the spring 57 is greater than zero and preferably under tension, for example, five to eight pounds. This not only serves to hold the device in a locked position but also requires downward vertical pulling on the rod 14 to prevent operation of the lock. For example, if downward pressure on the rod 14 is released at any time during raising or lowering, the locking device 12 will automatically engage and lock the reels against upward and downward release.

Since the operation of the device and various components have been described in detail in the foregoing description, no additional description is required.

Obviously, many modifications to the operating device can be made, especially to the locking means, such as a spring loaded latch and the like. The arrangement is easy to operate by an unskilled user and has safety devices to automatically provide for errors. The rod is simply rotated to raise the object until the locking device is engaged, allowing the rod to be removed. The length of the rod and diameter of the drums are factors which can be easily calculated depending upon the degree of vertical travel and the height of the bracket.

What is claimed is:

1. An arrangement for a failsafe vertical raising and lowering an object from a lower on the ground position to an above ground, elevated position over the head of the operator, said arrangement comprising an operating device mounted near the elevated position and above the head of the operator, said operating device comprising a fixed bracket adapted to be mounted adjacent the elevated position, a short vertical shaft extending a short distance adjacent said elevated position and above the operator, said vertical shaft having and being mounted for rotation around a vertical axis in the bracket, a horizontal reel above and directly affixed to the vertical shaft and rotating about said vertical axis, a pair of lines affixed to and wound about said reel at one end and two free ends extending from said reel first in generally horizontal direction, a pair of spaced pulley means for changing the free ends of respective lines from a generally horizontal direction to a generally downward direction, with said free ends being capable of being extended near the lower ground position and adapted for attachment to the object the to be raised and lowered, a long vertical rod means operatively but removably connected to a lower end of said vertical shaft for direct rotation of said shaft and said directly affixed reel in either rotary direction to wind on or wind off the pair of lines from said reel for raising or lowering said object, crank means on the lower portion of said rod for rotation of the same, said vertical shaft and directly affixed reel by said operator, said crank means providing mechanical advantage to lift said object, said object being raised to an elevated position when said rod means is rotated by said crank means about its axis in a first direction, and said object being lowered upon rotation of the rod means in the opposite direction, said long rod means extending downwardly from said short vertical shaft for manual operation by said individual operator, said rod means being attachable and detachable from said shaft to create clearance between said device and raised object and the ground to permit a human to pass below, and automatic lock means associated with said shaft and reel for releasably locking said shaft and reel in at least said elevated position, said automatic lock means being biased toward a locking position, said automatic lock means being released upon exertion of a force on said shaft means by said operator on said rod means to permit said operator to turn said crank means in one or the other direction to raise or lower said object.

2. The arrangement of claim 1, wherein said rod means has one of an opening and a hook and the shaft has the other of a hook and opening, and is attachable and detachable from said shaft by engagement of said hook in said opening.

3. The arrangement of claim 1, wherein said lock means is released upon exertion of a downwardly vertical force on said shaft means.

4. The arrangement of claim 3, wherein said lock means is spring biased by a spring toward an upper vertical direction toward a locking position.

5. The arrangement of claim 4, wherein a downward pull on said rod means causes release of said spring, and a release of said downward pull causes automatic locking of said lock means.

6. The arrangement of claim 1, wherein said vertical shaft has an elongated slot therein, and a horizontal rod passes through said slot and is relatively movable vertically therein.

7. The arrangement of claim 6, wherein said bracket comprises downwardly extending tabs engageable with said horizontal rod.

8. The arrangement of claim 6, wherein said horizontal rod has rollers near the ends thereof engageable with said tabs.

9. The arrangement of claim 8, wherein said tabs are inclined inwardly.

10. The arrangement of claim 1, comprising additional damping device means mounted between said vertical shaft and said bracket, said damping device means serving to allow free wheeling of the vertical shaft and reel as the object is being raised, and damped rotation of the vertical shaft and reel as the object is being lowered.

11. An arrangement as in claim 1, wherein said object is a bicycle having handle bars and a seat and one of said lines is adapted to be attached to said bicycle near the handle bars of said bicycle and the other of said lines is adapted to be attached to said bicycle near the seat of said bicycle.

12. The arrangement of claim 1, said automatic lock means being released upon exertion of a downwardly vertical force on said shaft means, said lock means being spring biased by a spring toward an upper vertical direction toward a locking position, a downward pull on said rod means causes release of said spring, and a release of said downward pull causes automatic locking of said lock means, said short vertical shaft has an elongated slot therein, and a horizontal rod passes through said slot and is movable vertically therein, said bracket having downwardly extending tabs engageable with said horizontal rod, said horizontal rod having rollers near the ends thereof engageable with said tabs, said tabs being inclined inwardly, and additional damping device means mounted between said vertical shaft and said bracket, said damping device means serving to allow free wheeling of the vertical shaft and reel as the object is being raised, and damped rotation of the vertical shaft and reel as the object is being lowered.

13. An arrangement as in claim 12, wherein said object is a bicycle having handle bars and a seat and one of said lines is adapted to be attached to said bicycle near the handle bars of said bicycle and the other of said lines is adapted to be attached to said bicycle near the seat of said bicycle.

14. An arrangement as in claim 12, wherein said reel has an integral one piece drum with two outer flanges and a center flange thereon with the first line wound on one side of the center flange and the other line being wound on the other side of the center flange.

15. An arrangement as in claim 1, wherein said reel has an integral one piece drum with two outer flanges and a center flange thereon with the first line wound on one side of the center flange and the other line being wound on the other side of the center flange.

16. An arrangement as in claim 1, wherein reel is in the form of a drum, said drum for said first line and said drum for other line is integral, said drum having a pair of outer flanges at its ends to contain said lines.

17. An arrangement as in claim 16, further comprising a center flange on said drum between said outer flanges.

18. An arrangement for a failsafe vertical raising and lowering an object from a lower position to an above ground, elevated position, said arrangement comprising an operating device mounted near the elevated position, said operating device comprising a fixed bracket adapted to be mounted adjacent the elevated position, a short vertical shaft extending a short distance adjacent said elevated position, said vertical shaft having and being mounted for rotation around a vertical axis in the bracket, a horizontal reel directly affixed to the vertical shaft and rotating about said vertical axis, a pair of lines affixed to and wound about said reel and having two free ends extending from said reel generally horizontally, a pair of spaced pulley means for changing the free ends of respective lines from generally horizontally generally downwardly with said free ends being capable of being extended near the lower ground position and adapted for attachment to the object to be raised and lowered, a long vertical rod means operatively but removably connected to a lower end of said vertical shaft for direct rotation of said shaft and said directly affixed reel in either rotary direction to wind on or wind off the pair of lines from said reel for raising or lowering said object, crank means on the lower portion of said rod for rotation of the same, said vertical shaft and directly affixed reel by said operator, said crank means lifts said object to an elevated position when said rod means is rotated by said crank means about its axis in a first direction, and said object being lowered upon rotation of the rod means in the opposite direction, and automatic lock means associated with said shaft and reel for releasably locking said shaft and reel in at least said elevated position, said automatic lock means being biased toward a locking position, said automatic lock means being released upon exertion of a vertical force on said shaft means by said operator on said rod means to permit said operator to turn said crank means in one or the other direction to raise or lower said object.

* * * * *